(12) United States Patent
Inagaki

(10) Patent No.: US 12,340,601 B2
(45) Date of Patent: Jun. 24, 2025

(54) IMAGE PROCESSING DEVICE, IMAGE PROCESSING METHOD, AND RECORDING MEDIUM

(71) Applicant: NEC Corporation, Tokyo (JP)

(72) Inventor: Kazuki Inagaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 603 days.

(21) Appl. No.: 17/617,089

(22) PCT Filed: Jun. 11, 2020

(86) PCT No.: PCT/JP2020/022977
§ 371 (c)(1),
(2) Date: Dec. 7, 2021

(87) PCT Pub. No.: WO2020/250962
PCT Pub. Date: Dec. 17, 2020

(65) Prior Publication Data
US 2022/0237929 A1    Jul. 28, 2022

(30) Foreign Application Priority Data

Jun. 11, 2019  (JP) ................................ 2019-108370

(51) Int. Cl.
*G06V 20/59*   (2022.01)
*G06T 7/73*    (2017.01)
(Continued)

(52) U.S. Cl.
CPC .............. *G06V 20/597* (2022.01); *G06T 7/73* (2017.01); *G06V 40/168* (2022.01); *G06V 40/18* (2022.01)

(58) Field of Classification Search
CPC ...... G06V 40/18; G06V 40/168; G06V 20/59; G06V 20/56; G06V 20/597; G06T 7/73;
(Continued)

(56) References Cited

U.S. PATENT DOCUMENTS 10,632,910 B2 *  4/2020  Shimizu .................... B60Q 9/00
11,417,123 B2 *  8/2022  Inagaki .................... G08G 1/09
(Continued)

FOREIGN PATENT DOCUMENTS

CN      109774722 A  *  5/2019  ......... G06K 9/00228
DE      112018006987 T5 * 10/2020  ........... B60K 28/066
(Continued)

OTHER PUBLICATIONS

International Search Report for PCT Application No. PCT/JP2020/022977, mailed on Sep. 8, 2020.

*Primary Examiner* — Manav Seth
(74) *Attorney, Agent, or Firm* — Sughrue Mion, PLLC

(57) ABSTRACT

Sensing information indicating a state of a moving body is acquired. A plurality of captured images that capture a driver driving the moving body are acquired. From the plurality of captured images, captured images captured in a state of the moving body traveling forward based on the sensing information. A reference line of sight direction in a case of the driver facing forward is detected based on a statistical value of a line of sight direction of the driver indicated by each of the identified captured images.

13 Claims, 11 Drawing Sheets

(51) Int. Cl.
*G06V 40/16* (2022.01)
*G06V 40/18* (2022.01)

(58) Field of Classification Search
CPC ..... G08G 1/04; G08G 1/16; B60W 2540/225; B60W 40/105; B60W 2520/105; B60W 2520/10; B60W 40/09; B60W 40/08; B60W 2040/0818; B60K 28/066
See application file for complete search history.

(56) References Cited

U.S. PATENT DOCUMENTS

| | | | |
|---|---|---|---|
| 11,643,012 B2* | 5/2023 | Ogata | B60R 1/28 |
| | | | 382/104 |
| 2016/0358028 A1 | 12/2016 | Sugie et al. | |
| 2019/0147269 A1* | 5/2019 | Aoi | G06V 20/597 |
| | | | 382/103 |
| 2019/0147270 A1* | 5/2019 | Aoi | G06V 20/597 |
| | | | 382/118 |
| 2019/0147274 A1* | 5/2019 | Tanaka | B60W 40/08 |
| | | | 701/36 |
| 2019/0339786 A1* | 11/2019 | Takeuchi | B60W 50/16 |
| 2020/0058136 A1 | 2/2020 | Morishita | |
| 2021/0004616 A1* | 1/2021 | Inagaki | G07C 5/00 |
| 2021/0027078 A1* | 1/2021 | Sakuma | G06V 40/161 |
| 2021/0039678 A1* | 2/2021 | Shojima | B60W 60/0051 |
| 2021/0370981 A1* | 12/2021 | Inagaki | G08G 1/16 |

FOREIGN PATENT DOCUMENTS

| | | | | |
|---|---|---|---|---|
| JP | 2004519788 A | * | 7/2004 | G08B 21/00 |
| JP | 2004268845 A | * | 9/2004 | B62D 15/029 |
| JP | 2008-243031 A | | 10/2008 | |
| JP | 2008282153 A | * | 11/2008 | G06F 9/4831 |
| JP | 2016001170 A | * | 1/2016 | G01C 21/3415 |
| JP | 2016-057839 A | | 4/2016 | |
| JP | 2017-004117 A | | 1/2017 | |
| WO | 2018/078857 A1 | | 5/2018 | |
| WO | WO-2018212090 A1 | * | 11/2018 | B60R 21/00 |

* cited by examiner

IMAGE PROCESSING DEVICE, IMAGE PROCESSING METHOD, AND RECORDING MEDIUM

This application is a National Stage Entry of PCT/JP2020/022977 filed on Jun. 11, 2020, which claims priority from Japanese Patent Application 2019-108370 filed on Jun. 11, 2019, the contents of all of which are incorporated herein by reference, in their entirety.

TECHNICAL FIELD

The present invention relates to an image processing device, an image processing method, and a recording medium.

BACKGROUND ART

There have been many developments in improving the technology related to driving of a moving body such as an automobile. As related techniques, Patent Document 1 discloses a technique for detecting the orientation of a driver's face, and Patent Document 2 discloses a technique for detecting a line of sight direction.

PRIOR ART DOCUMENTS

Patent Documents

[Patent Document 1] Japanese Unexamined Patent Application, First Publication No. 2016-57839
[Patent Document 2] PCT International Publication No. WO 2018/078857

SUMMARY OF THE INVENTION

Problem to be Solved by the Invention

In detection of the orientation of a driver's face mentioned above, there is a demand for an improved technique for easily and automatically detecting the orientation of a driver's line of sight direction in which a moving body is traveling straight.

An example object of the present invention is to provide an image processing device, an image processing method, and a recording medium capable of solving the above problem.

Means for Solving the Problem

According to a first example aspect of the present disclosure, an image processing device includes: a sensing information acquisition means for acquiring sensing information indicating a state of a moving body; an image acquisition means for acquiring a plurality of captured images that capture a driver driving the moving body; and a reference direction detection means for identifying, from the plurality of acquired captured images, a plurality of captured images captured in a state of the moving body traveling forward based on the sensing information, and detecting a reference line of sight direction in a case of the driver facing forward, based on a statistical value of a line of sight direction of the driver indicated by each of the plurality of identified captured images.

According to a second example aspect of the present disclosure, an image processing method includes: acquiring sensing information indicating a state of a moving body; acquiring a plurality of captured images that capture a driver driving the moving body; identifying, from the plurality of acquired captured images, the captured image captured in a state of the moving body traveling forward based on the sensing information; and detecting a reference line of sight direction in a case of the driver facing forward, based on a statistical value of a line of sight direction of the driver indicated by each of the plurality of identified captured images.

In a third example aspect of the present disclosure, a recording medium stores a program for causing a computer of an image processing device to execute: acquiring sensing information indicating a state of a moving body; acquiring a plurality of captured images that capture a driver driving the moving body; acquiring, from the plurality of acquired captured images, a plurality of captured images captured in a state of the moving body traveling forward based on the sensing information; and detecting a reference line of sight direction in a case of the driver facing forward, based on a statistical value of a line of sight direction of the driver indicated by each of the plurality of acquired captured images.

Effect of the Invention

According to an example embodiment of the present invention, it is possible to easily and automatically detect a driver's line of sight orientation in the direction in which the moving body is traveling straight.

EXAMPLE EMBODIMENT

Hereinafter, a looking away determination system 100 including an image processing device 1 according to an example embodiment of the present invention will be described, with reference to the drawings.

Figure 1:
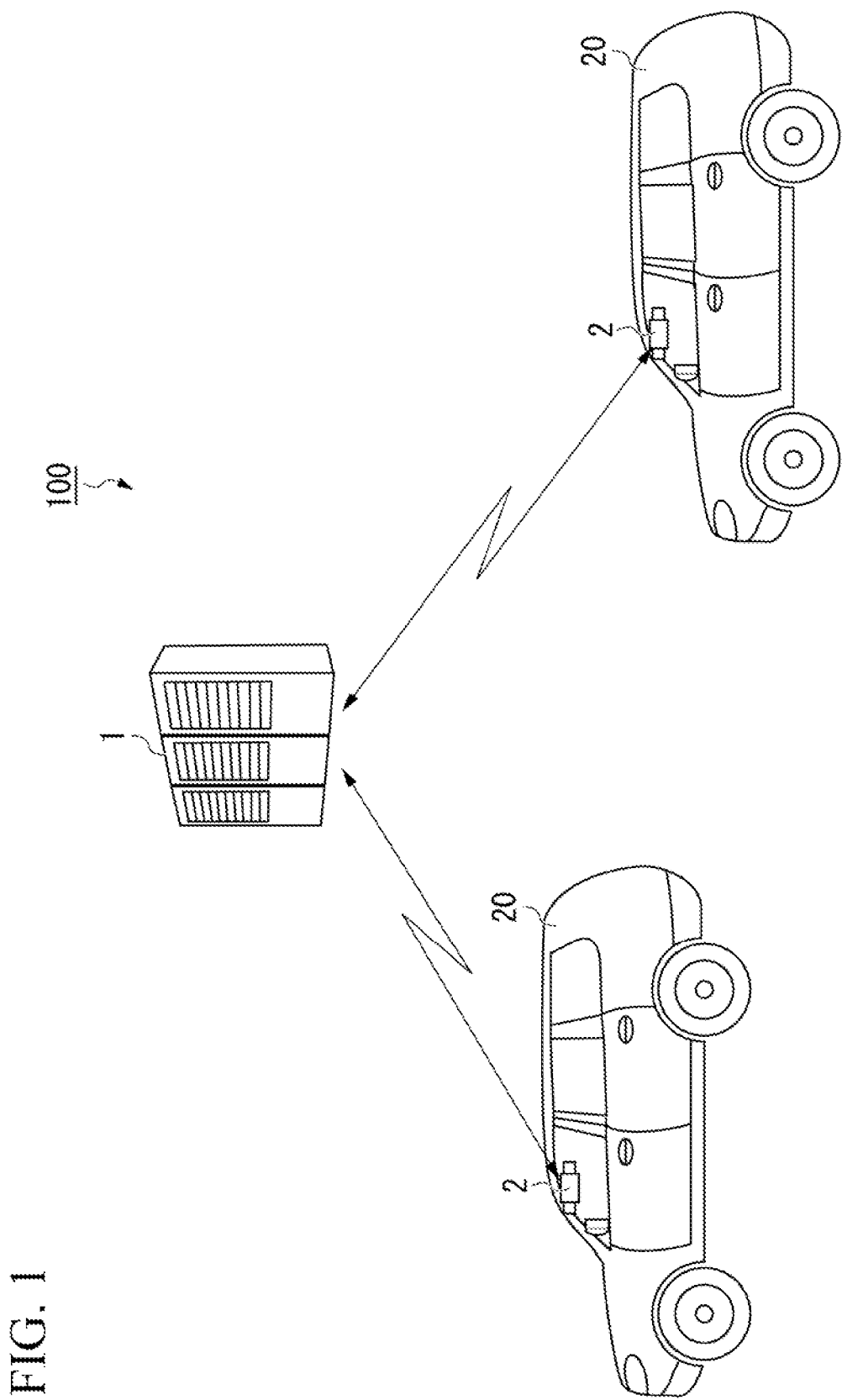
FIG. 1 is a diagram showing a looking away determination system according to the present example embodiment.

FIG. 1 is a diagram showing the looking away determination system 100 according to the example embodiment of the present invention.

As shown in FIG. 1, the looking away determination system 100 includes an image processing device 1 and a drive recorder 2 (in-vehicle device), which is an aspect of a driving status sensing device. The image processing device 1 and the drive recorder 2 are connected to each other via a wireless communication network or a wired communication network. As an example, the drive recorder 2 is provided in a vehicle 20. The image processing device 1 connects to and communicates with the drive recorder 2 installed in each of a plurality of vehicles 20 traveling in the city.

Figure 2:
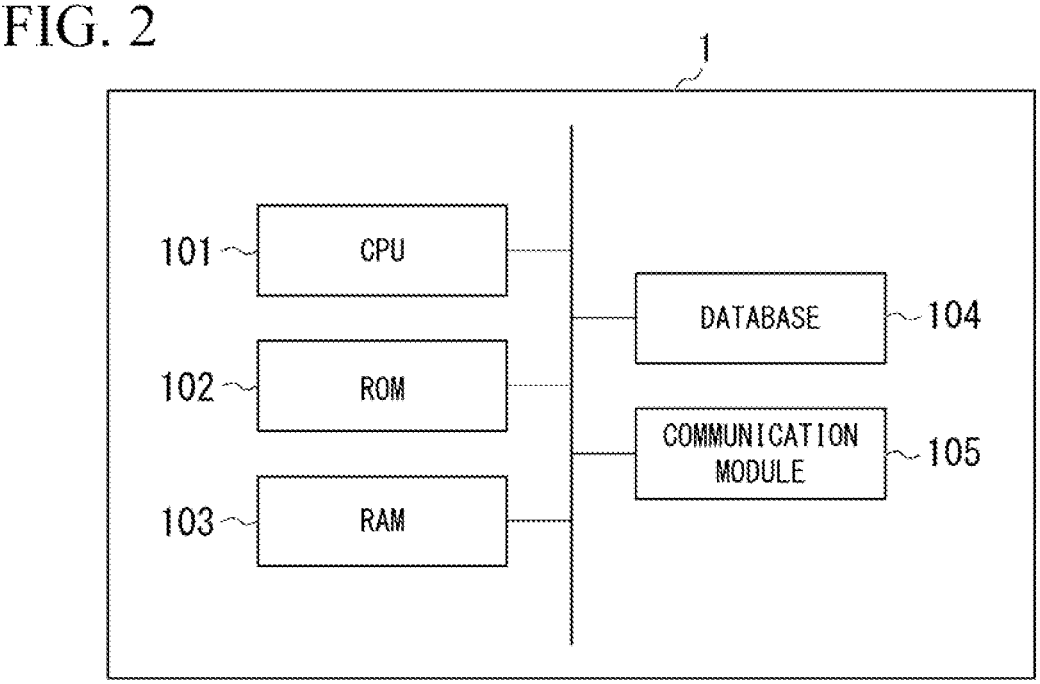
FIG. 2 is a hardware configuration diagram of an image processing device according to the present example embodiment.

FIG. 2 is a hardware configuration diagram of the image processing device 1.

As shown in FIG. 2, the image processing device 1 is a computer that includes hardware pieces such as a CPU (Central Processing Unit) 101, a ROM (Read Only Memory) 102, a RAM (Random Access Memory) 103, a database 104, and a communication module 105.

Figure 3:
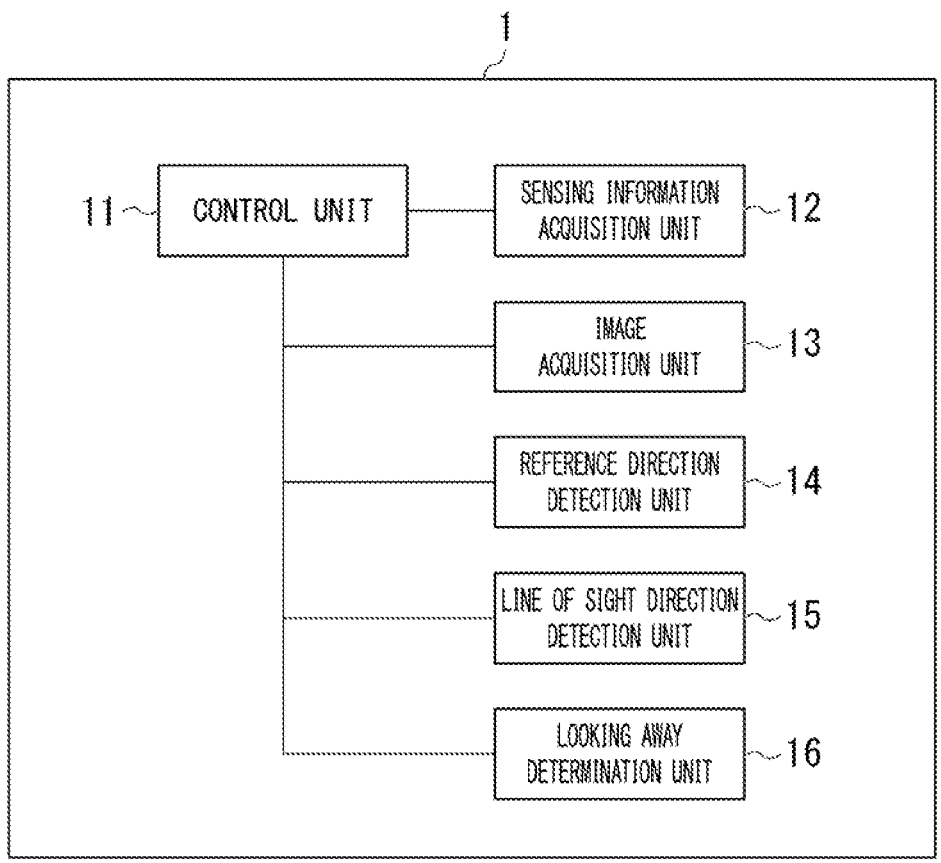
FIG. 3 is a functional block diagram of the image processing device according to the present example embodiment.

FIG. 3 is a functional block diagram of the image processing device 1.

The image processing device 1 is activated upon receiving electric power supplied thereto and executes a looking away determination program stored preliminarily. Therefore the image processing device 1 includes at least a control unit 11, a sensing information acquisition unit 12, an image acquisition unit 13, a reference direction detection unit 14, a line of sight direction detection unit 15, and a looking away determination unit 16.

The control unit 11 controls each functional unit of the image processing device 1.

The sensing information acquisition unit 12 acquires sensing information of the vehicle 20 other than image information, from the drive recorder 2 of the vehicle 20. The sensing information includes, for example, the acceleration rate, velocity, and steering wheel rotation angle of the vehicle 20. The sensing information may also include information on other vehicles 20. The sensing information is information that is sensed by sensors provided in the vehicle 20, and is acquired from those sensors and transmitted to the image processing device 1 by the drive recorder 2.

The image acquisition unit 13 acquires images captured by a camera 23 that is either provided in the drive recorder 2 or connected to and communicates with the drive recorder 2. The camera 23 is preliminarily installed at a position in the vehicle interior from which the face of the driver of the vehicle 20 can be captured.

The reference direction detection unit 14 acquires captured images captured in a state where the vehicle 20 is traveling forward on the basis of sensing information, and detects a reference line of sight direction in the captured image when the driver is facing forward, on the basis of statistical values of the line of sight direction of the driver indicated by the captured images. The reference line of sight direction is a direction that aligns with the straight-traveling direction of the vehicle when the vehicle is traveling straight.

The reference direction detection unit 14 may determine whether the moving body is traveling forward on the basis of the acceleration, and acquire captured images captured in a state where the moving body is traveling forward.

Alternatively, the reference direction detection unit 14 may acquire captured images captured in a state where the velocity is equal to or higher than a predetermined velocity and the steering wheel rotation angle is an angle indicating forward.

Alternatively, the reference direction detection unit 14 may acquire captured images captured in a state where the velocity is equal to or higher than a predetermined velocity.

The reference direction detection unit 14 detects a reference line of sight direction in captured images captured when the driver is facing forward, on the basis of statistical values of the line of sight direction of the driver indicated by the acquired captured images.

When determining a looking away state, the line of sight direction detection unit 15 detects the current line of sight direction of the driver from the captured images.

The looking away determination unit 16 determines a looking away state on the basis of the difference between the reference line of sight direction in the captured image captured when the driver is facing forward and the current line of sight direction.

Figure 4:
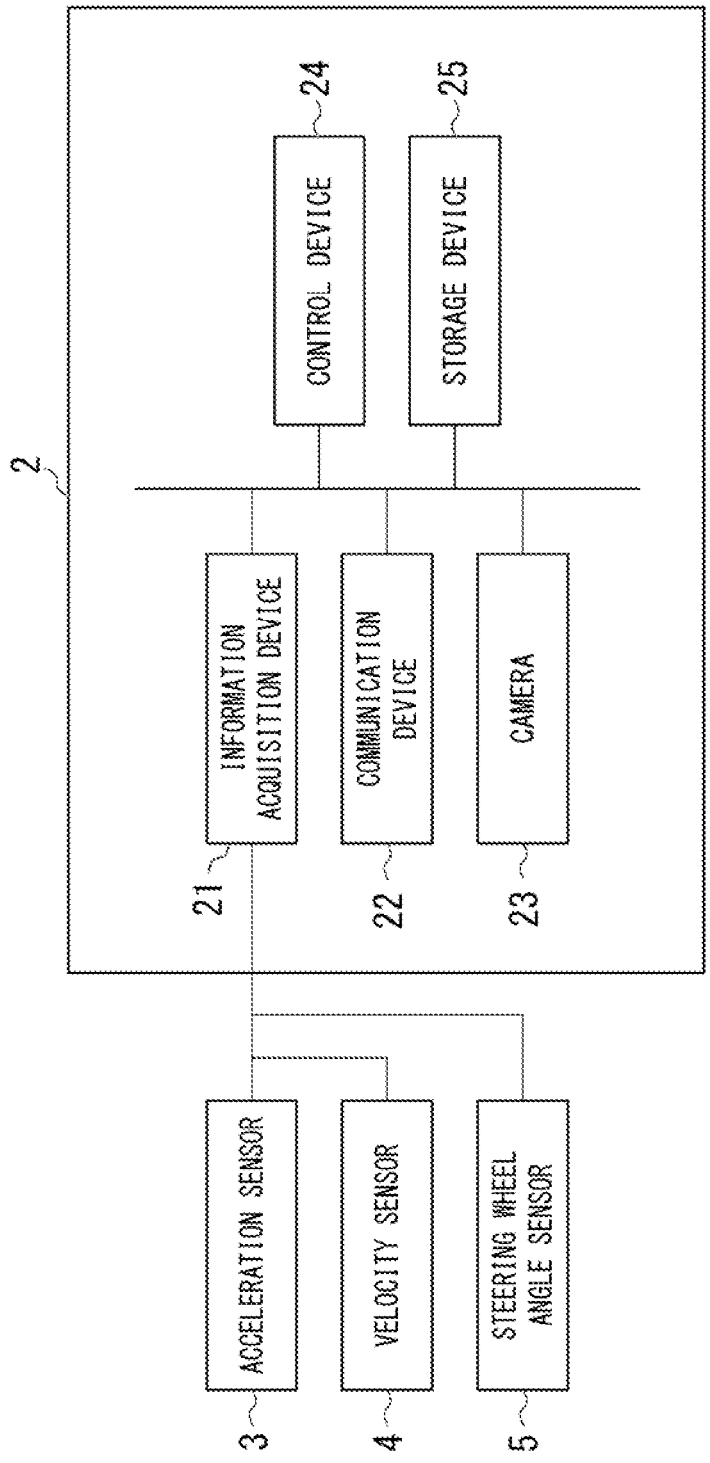
FIG. 4 is a diagram showing a hardware configuration of a drive recorder according to the present example embodiment.

FIG. 4 is a diagram showing a hardware configuration of the drive recorder 2.

The drive recorder 2 includes an information acquisition device 21, a communication device 22, a camera 23, a control device 24, a storage device 25, and so forth. The information acquisition device 21 is connected to an acceleration sensor 3, a velocity sensor 4, and a steering wheel angle sensor 5 by means of signal lines or the like. The acceleration sensor 3 detects the acceleration rate of the vehicle 20. The velocity sensor 4 detects the velocity of the vehicle 20. The steering wheel angle sensor 5 detects the steering wheel rotation angle. The information acquisition device 21 acquires sensing information such as the acceleration rate, the velocity, and the steering wheel angle of the vehicle 20. The sensing information may also include information detected by other sensors.

The communication device 22 is connected to and communicates with the image processing device 1. The communication device 22 is connected to and communicates with the image processing device 1 via a base station apparatus or the like.

The camera 23 captures at least the interior of the vehicle 20 and generates captured images thereof. The captured images may be a moving image or still images.

The control device 24 controls each function of the drive recorder 2. The control device 24 is a computer including a CPU, a ROM, a RAM, and so forth.

The storage device 25 stores captured images such as moving images and still images, and sensing information acquired by the information acquisition device 21.

Figure 5:
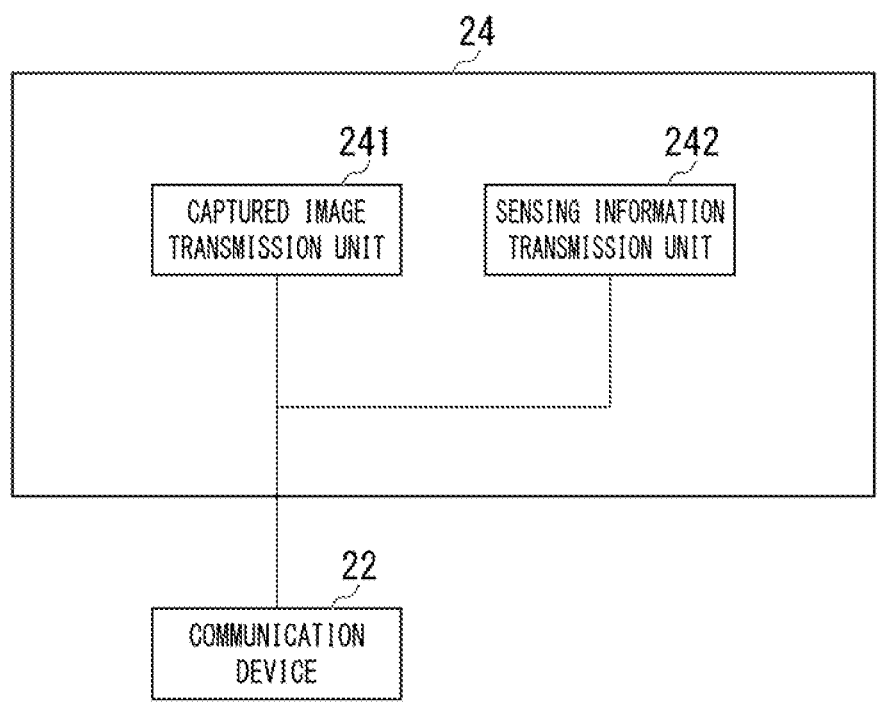
FIG. 5 is a functional block diagram of a control device according to the present example embodiment.

FIG. 5 is a functional block diagram of the control device 24 included in the drive recorder 2.

The control device 24 executes a control program when the drive recorder 2 is activated. The control device 24 thereby demonstrates each function of a captured image transmission unit 241, a sensing information transmission unit 242, and so forth.

The captured image transmission unit 241 acquires captured images generated by the camera 23 and transmits them to the image processing device 1.

The sensing information transmission unit 242 acquires sensing information from the information acquisition device 21 and transmits it to the image processing device 1.

Figure 6:
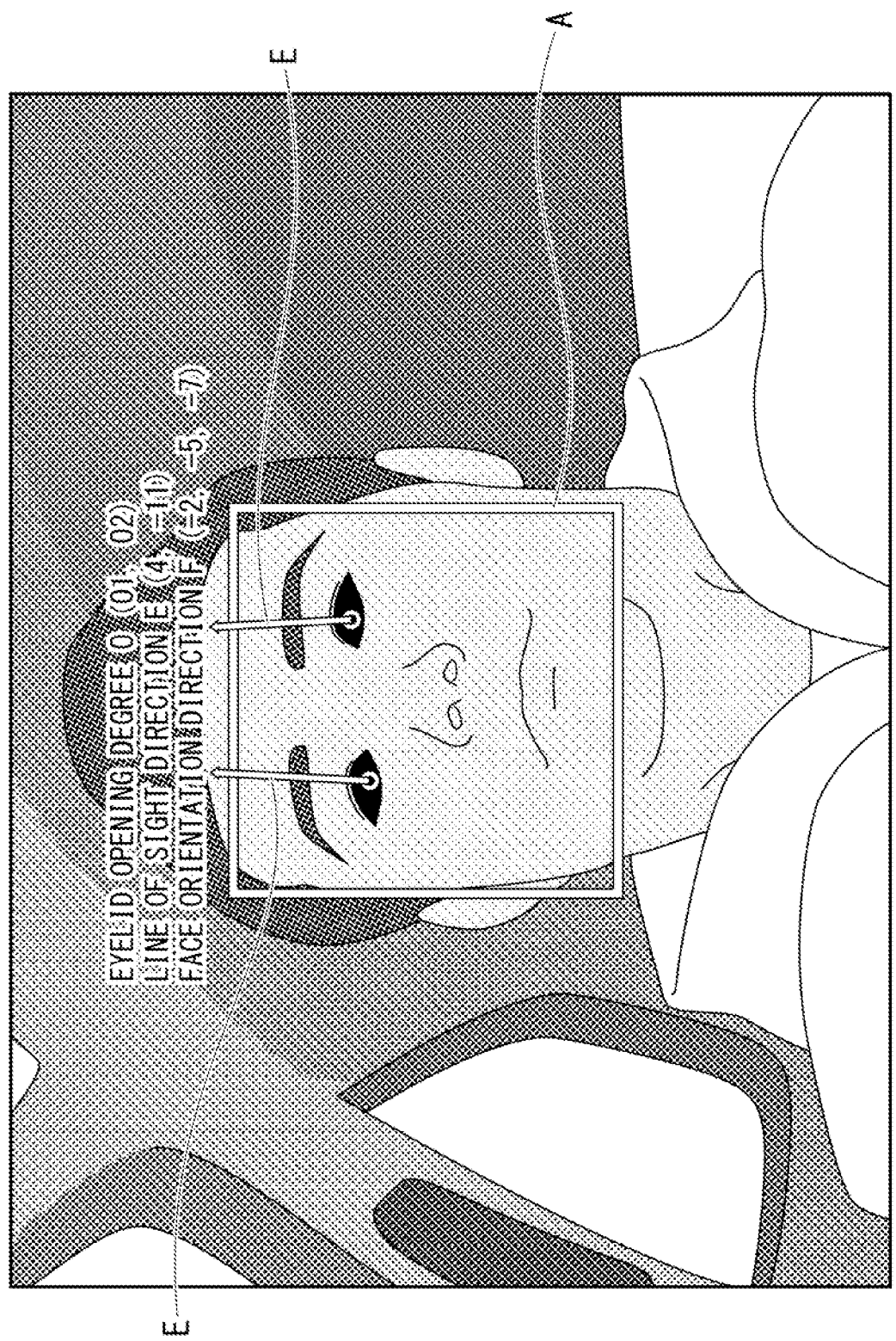
FIG. 6 is a diagram showing an overview of a reference direction detection process according to the present example embodiment.

FIG. 6 is a diagram showing an overview of a reference direction detection process.

The reference direction detection unit 14 of the image processing device 1 detects a reference line of sight direction of the driver shown in captured images, on the basis of the acquired captured images from the drive recorder 2. The reference line of sight direction is a line of sight direction at the time when the driver is visually recognizing the forward straight-traveling direction of the vehicle 20. The driver is extremely likely to be visually recognizing the forward straight-traveling direction in those cases where the vehicle 20 is traveling at a predetermined acceleration rate, the vehicle 20 is traveling at a predetermined velocity or higher while the steering wheel angle is indicating straight-traveling being performed, or the vehicle 20 is traveling at a high velocity equal to or higher than a predetermined threshold value, such as 100 km per hour or higher. The reference direction detection unit 14 acquires captured images of the driver captured when the vehicle 20 is in such a state where the driver is highly likely to visually recognize the forward straight-traveling direction, and detects a reference line of sight direction on the basis of the captured images.

As shown in FIG. 6, the reference direction detection unit 14 recognizes a face range A of the driver shown in captured images. A known technique may be used for recognizing the face range A. Moreover, the reference direction detection unit 14 recognizes a line of sight direction E (E1, E2) on the basis of the positions of pupils of the eyes in eyelid opening ranges included in the face range A. Also, the reference direction detection unit 14 may recognize a face orientation direction F (F1, F2, F3). In FIG. 6, the line of sight direction of the driver is denoted by E. Moreover, the face orientation direction of the driver is denoted by F1, F2, and F3. The reference direction detection unit 14 calculates the mean value of the driver's left and right eyes as the driver's line of sight direction E. The driver's line of sight direction E is, where the optical axis of the camera is taken as a reference, a value represented in numerical values indicating the lateral deviation and the vertical deviation from the optical axis. A known technique may be used for the process of detecting the driver's line of sight direction E. The reference direction detection unit 14 may use, for example, the line of sight direction detection technique disclosed in PCT International Publication No. WO 2018/078857 cited as Patent Document 2.

For example, the reference direction detection unit 14 calculates the line of sight direction E as (4, −11). In this case, the line of sight direction E (4, −11) is such that the numerical value "4" indicates the lateral deviation (E1) of the line of sight direction from the optical axis of the camera, and the numerical value "−11" indicates the vertical deviation (E2) of the line of sight direction from the optical axis of the camera. The numerical value of the lateral deviation of the line of sight direction takes a positive value when it deviates to the right from the optical axis of the camera. In contrast, the numerical value of the lateral deviation of the line of sight direction takes a negative value when it deviates to the left from the optical axis of the camera. The numerical value of the vertical deviation of the line of sight direction takes a positive value when it deviates downward from the optical axis of the camera. In contrast, the numerical value of the vertical deviation of the line of sight direction takes a negative value when it deviates upward from the optical axis of the camera.

The reference direction detection unit 14 calculates the face orientation direction F as (−2, −5, −7). In this case, the face orientation direction F (−2, −5, −7) is such that the numerical value "−2" indicates the lateral deviation (F1) of the face orientation direction from the optical axis of the camera, the numerical value "−5" indicates the vertical deviation (F2) of the face orientation direction from the optical axis of the camera, and the numerical value "−7" indicates the rotation direction (F3) of the face orientation (the rectangular plane of the face range A) about the optical axis of the camera. The numerical value of the lateral deviation of the face orientation direction takes a positive value when it deviates to the right from the optical axis of the camera. By contrast, the numerical value of the lateral deviation of the face orientation direction takes a negative value when it deviates to the left from the optical axis of the camera. The numerical value of the vertical deviation of the face orientation direction takes a positive value when it deviates downward from the optical axis of the camera. In contrast, the numerical value of the lateral deviation of the face orientation direction takes a negative value when it deviates upward from the optical axis of the camera. The numerical value of the rotation direction of the face orientation (the rectangular plane of the face range A) about the optical axis of the camera takes a positive value when it rotates to the left. In contrast, the numerical value of the rotation direction of the face orientation about the optical axis of the camera takes a negative value when it rotates to the right. FIG. 6 shows a degree of eyelid opening O (O1, O2) of the left and right eyelids. The reference direction detection unit 14 may calculate this degree of eyelid opening O.

The reference direction detection unit 14 detects the reference line of sight direction in captured images when the driver is facing forward (the forward straight-traveling direction of the vehicle 20), on the basis of statistical values of the line of sight direction of the driver indicated by captured images captured when the vehicle 20 is in a predetermined state where it is traveling forward on the basis of sensing information. The state where the vehicle 20 is traveling forward includes states where the acceleration rate is equal to or higher than a predetermined threshold value, where the velocity is equal to or higher than a predetermined velocity while the steering wheel rotation angle is an angle indicating forward, and where the velocity is equal to or higher than a predetermined threshold value.

Figure 7:
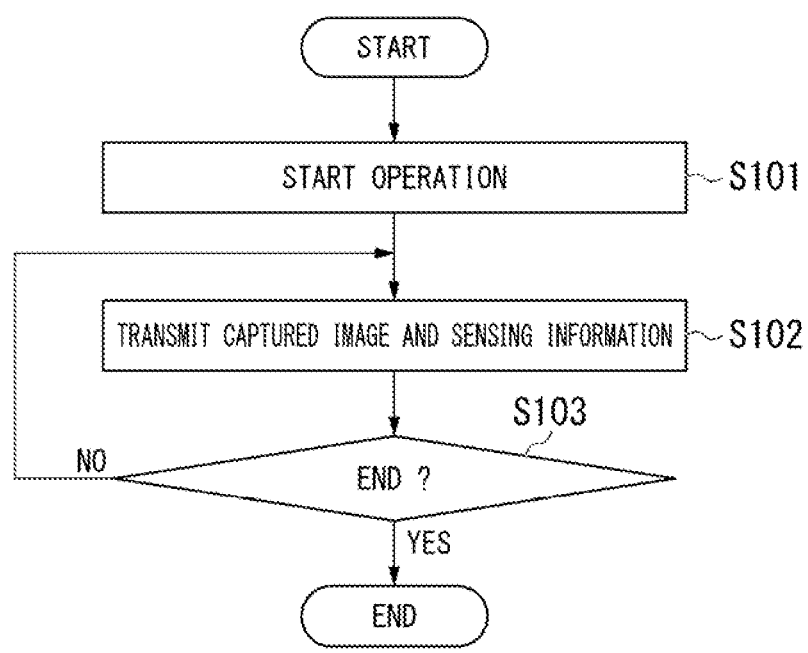
FIG. 7 is a first diagram showing a processing flow of the drive recorder according to the present example embodiment.

FIG. 7 is a first diagram showing a processing flow of the drive recorder 2.

Next, the processing flow of a driving status monitoring system (looking away determination system) will be described in order.

First, the process in the drive recorder 2 for transmitting captured images and sensing information will be described.

When the electrical system of the vehicle is activated, the drive recorder 2 starts to operate (Step S101). Also, when the electrical system of the vehicle is activated, the acceleration sensor 3, the velocity sensor 4, and the steering wheel angle sensor 5 start sensing. Then after the drive recorder 2 has been activated, the information acquisition device 21 acquires sensing information such as the acceleration rate, the velocity, and the steering wheel angle. The information acquisition device 21 outputs the sensing information to the control device 24.

In the drive recorder 2, the camera 23 generates captured images. The camera 23 outputs the captured images to the control device 24. The control device 24 acquires the sensing information and the captured images. In the control device 24, the captured image transmission unit 241 requests the communication device 22 to transmit the acquired captured images. Moreover, the sensing information transmission unit 242 requests the communication device 22 to transmit the acquired sensing information. The communication device 22 transmits the captured images and the sensing information to the image processing device 1 (Step S102). It is assumed that the captured images and the sensing information store therein the generation times of that information as well as the ID of the drive recorder 2. The control device 24 determines whether or not to end the process (Step S103). If the process is not to end, the control device 24 repeats transmission of captured images and sensing information to the image processing device 1.

The control device 24 may determine the timing of transmitting the captured images and sensing information. For example, as a state where the vehicle 20 is traveling forward, the control device 24 may detect, on the basis of the sensing information, a state where the acceleration rate is equal to or higher than a predetermined threshold value, where the velocity is equal to or higher than a predetermined velocity while the steering wheel rotation angle is an angle indicating forward, or where the velocity is equal to or higher than a predetermined threshold value and the timing thereof may be determined as the timing of transmitting the captured images and sensing information. Thereby, the amount of communication performed between the drive recorder 2 and the image processing device 1 is reduced. As a result, in the image processing device 1, it is possible to omit the process of identifying captured images in the case where the acceleration rate is equal to or higher than a predetermined threshold value, where the velocity is equal to or higher than a predetermined velocity while the steering wheel rotation angle is an angle indicating forward, or where the velocity is equal to or higher than a predetermined threshold value. The following describes examples of the processing performed by the image processing device 1 in those cases where the acceleration rate is equal to or higher than a predetermined value, where the velocity is equal to or higher than a predetermined velocity while the steering wheel rotation angle is an angle indicating forward, and where the velocity is equal to or higher than a predetermined velocity.

Figure 8:
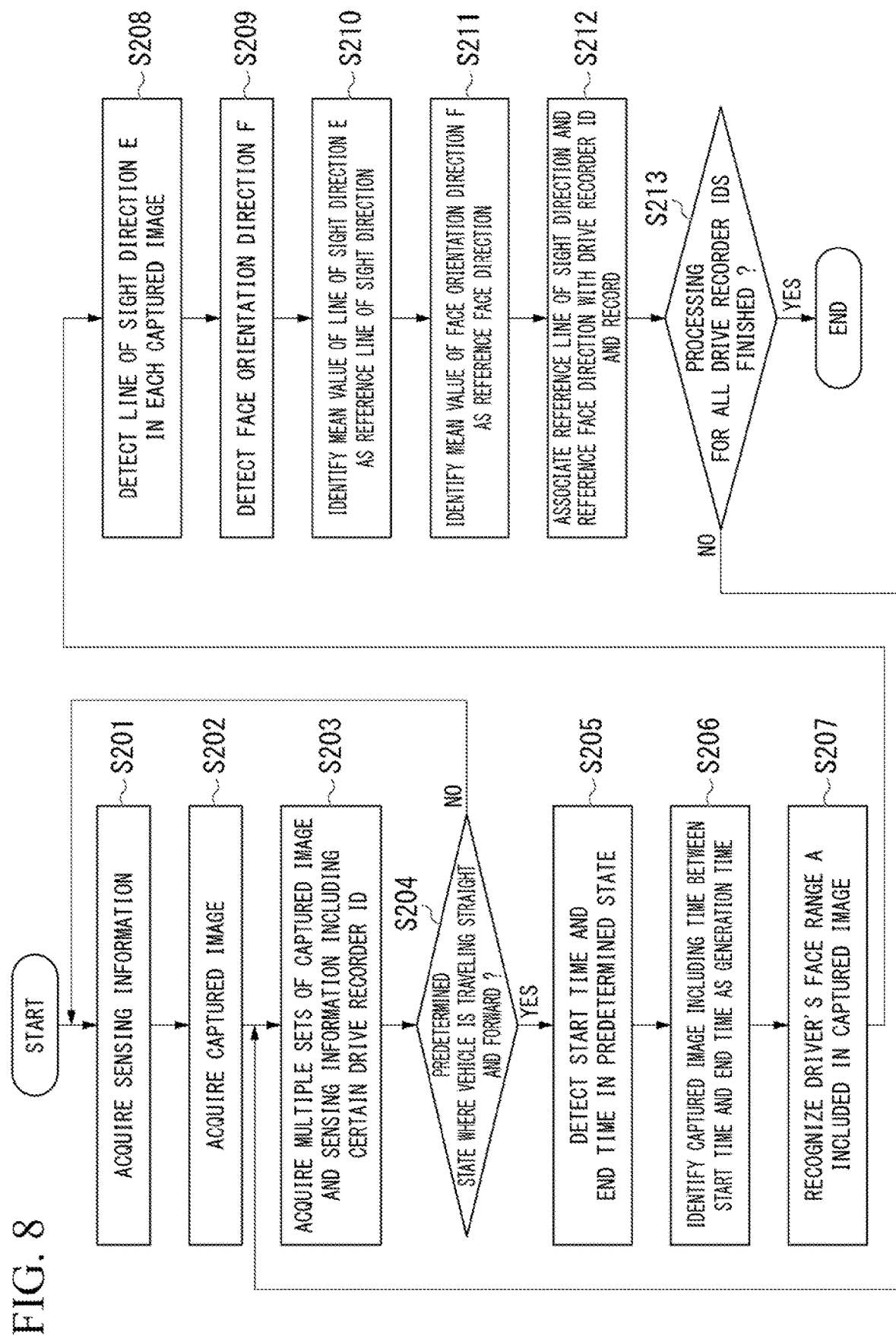
FIG. 8 is a first diagram showing a processing flow of the image processing device according to the present example embodiment.

FIG. 8 is a first diagram showing a processing flow of the image processing device 1.

In the image processing device 1, the sensing information acquisition unit 12 acquires sensing information transmitted from the drive recorder 2 (Step S201). The sensing information acquisition unit 12 stores the sensing information in the database 104. Also, the image acquisition unit 13 acquires captured images transmitted from the drive recorder 2 (Step S202). The image acquisition unit 13 stores the captured images in the database 104. In the database 104, the sensing information and the captured images may be recorded in association with each other on the basis of the ID of the drive recorder 2. The sensing information acquisition unit 12 acquires sensing information from the drive recorder 2 of the vehicle 20 being driven at predetermined timings or sequentially, and records the sensing information in the database 104. The image acquisition unit 13 acquires captured images from the drive recorder 2 of the vehicle 20 being driven at predetermined timings or sequentially, and records the captured images in the database 104. The control unit 11 instructs the reference direction detection unit 14 to perform the process of detecting a reference line of sight direction.

The reference direction detection unit 14 acquires a plurality of sets of a captured image and sensing information that include the ID of a certain drive recorder 2, from sets of captured images and sensing information recorded in the database 104 (Step S203). The reference direction detection unit 14 determines whether the vehicle 20 is in a predetermined state where it is traveling straight and forward, on the basis of the acquired sensing information (Step S204). In the present example embodiment, the reference direction detection unit 14 determines whether the vehicle 20 is traveling straight and forward and the aspect of the straight traveling is in a predetermined state, on the basis of the acquired sensing information. The aspect of straight traveling being in the predetermined state refers to any one of the states: a state where the acceleration rate of the vehicle 20 is equal to or higher than a predetermined threshold value, a state where the velocity is equal to or higher than a predetermined velocity while the steering wheel rotation angle is an angle indicating forward, and a state where the velocity is equal to or higher than a predetermined threshold value.

If the vehicle 20 is in the predetermined state of traveling straight and forward, the reference direction detection unit 14 detects from the acquired sensing information a start time and an end time when the vehicle 20 is in the predetermined state (such as where the acceleration rate is equal to or higher than a predetermined threshold value) (Step S205). Alternatively, the reference direction detection unit 14 may detect from the acquired sensing information a start time and an end time in the case where the velocity is equal to or higher than a predetermined velocity and the steering wheel rotation angle is an angle indicating forward. Alternatively, the reference direction detection unit 14 may detect from the acquired sensing information a start time and an end time in the case where the velocity is equal to or higher than a predetermined threshold value. The reference direction detection unit 14 identifies captured images that includes, as generation times, times between the detected start time and end time, among the plurality of acquired captured images (Step S206). In the case where the captured images are a moving image, the reference direction detection unit 14 may identify, as captured images, the frame images includes, as generation times, times between the detected start time and end time, among frame images included in the moving image.

The reference direction detection unit 14 recognizes the face range A of the driver included in the identified captured images (Step S207). The reference direction detection unit 14 detects the line of sight direction E in each captured image on the basis of the driver's eyelid ranges and pupil positions included in the face range A (Step S208). Also, the reference direction detection unit 14 detects the face orientation direction F on the basis of the driver's face information included in the face range A (Step S209). The reference direction detection unit 14 calculates the mean value of line of sight directions E calculated on the basis of a plurality of the captured images and the mean value of face orientation directions F. The reference direction detection unit 14 identifies the mean value of line of sight directions E as a reference line of sight direction (Step S210). Also, the reference direction detection unit 14 identifies the mean value of face orientation directions F as a reference face direction (Step S211). Then, the reference direction detection unit 14 records the reference line of sight direction and the reference face direction calculated in relation to a certain drive recorder 2, in the database 104 in association with the ID of the drive recorder 2 (Step S212).

As a result, it is possible to record the reference line of sight direction and the reference face direction when the vehicle 20 is traveling straight and forward and the aspect of the straight traveling is in the predetermined state. When the vehicle 20 is traveling forward and the aspect of the straight traveling is in the predetermined state (any one state of predetermined acceleration rate or higher, predetermined acceleration rate or higher while steering wheel angle is straight and forward, and predetermined velocity or higher), the direction of the driver's face is highly likely to be in the forward straight-traveling direction. Therefore, the reference line of sight direction and the reference face direction detected in such a state can be estimated to be the line of sight direction and the face direction when the driver is facing the forward straight-traveling direction of the vehicle 20.

The control unit 11 determines whether the processing for the IDs of all of the drive recorders 2 has been completed (Step S213). If the processing for the IDs of all of the drive recorders 2 has not been completed, the control unit 11 identifies the IDs of drive recorders 2 that have not been processed, and identifies the reference line of sight direction and the reference face direction on the basis of a plurality of sets of captured images and sensing information associated with those IDs. The control unit 11 (notification unit) may notify the drive recorder 2 of the determination target vehicle 20, of information indicating the reference line of sight direction.

Figure 9:
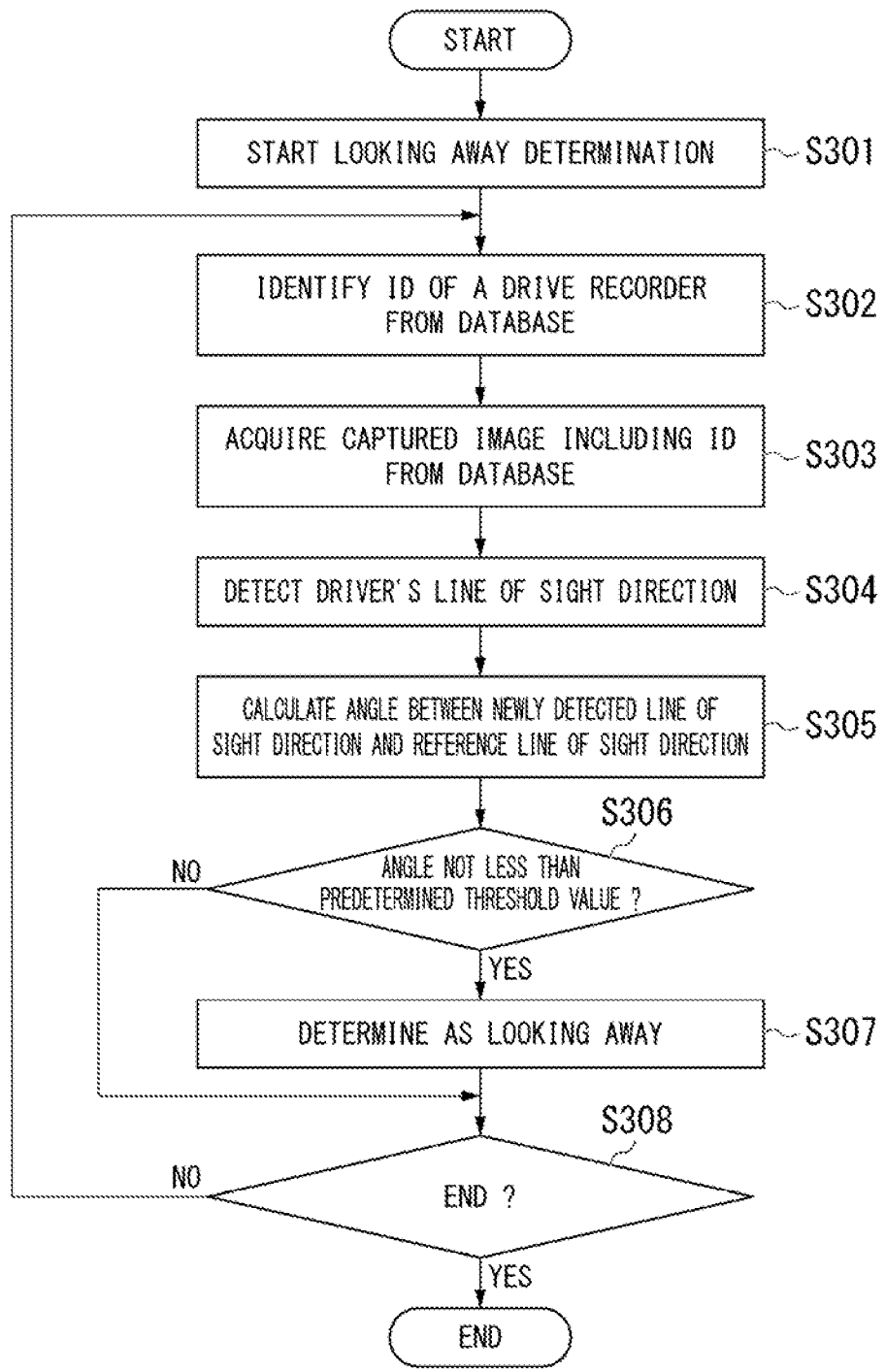
FIG. 9 is a second diagram showing a processing flow of the image processing device according to the present example embodiment.

FIG. 9 is a second diagram showing a processing flow of the image processing device 1.

The image processing device 1 determines whether the driver is looking away, using a reference line of sight direction and a reference face direction. Specifically, the control unit 11 starts a determination of looking away (Step S301). Then, the line of sight direction detection unit 15 identifies the ID of a certain drive recorder 2 from the database 104 on the basis of control of the control unit 11 (Step S302). The control unit 11 may identify the ID of the drive recorder 2 to be determined for looking away. Alternatively, on the basis of sensing information, the looking away determination unit 16 may identify sensing information at a time at which a high acceleration rate equal to or higher than a predetermined threshold value is shown, such as an acceleration rate at the time of incident occurrence, and may identify the ID of the drive recorder 2 included in the sensing information as an ID of the drive recorder 2 of the looking away determination target.

The line of sight direction detection unit 15 acquires the ID of the drive recorder 2 of the looking away determination target and acquires captured images that include the ID (Step S303). The line of sight direction detection unit 15 may extract captured images at a time at which an acceleration rate equal to or higher than a predetermined threshold value, such as an acceleration rate at the time of incident occurrence, from the acquired captured images. The line of sight direction detection unit 15 detects the line of sight direction of the driver included in the acquired captured images through a process similar to that described above (Step S304). The looking away determination unit 16 acquires the reference line of sight direction recorded in the database 104 in association with the acquired ID of the drive recorder 2. The looking away determination unit 16 calculates the angle between the newly detected line of sight direction and the reference line of sight direction (Step S305). The looking away determination unit 16 determines whether the angle between the newly detected line of sight direction and the reference line of sight direction is equal to or greater than a predetermined threshold value (Step S306). If the angle between the newly detected line of sight direction and the reference line of sight direction is equal to or greater than the predetermined threshold value, the looking away determination unit 16 determines the driver has looked away (Step S307). The control unit 11 determines whether to end the process (Step S308). If the process is not to end, the control unit 11 repeats the process from Step S302.

According to the above processing, regardless of the position where the camera 23 is mounted, it is possible, as long as it is mounted at a position from which the face of the driver can be captured, to determine whether or not the driver is looking away based on the driver's current line of sight direction, on the basis of the reference line of sight direction of the driver. Further, according to the processing of the image processing device 1 described above, it is possible to easily and automatically detect the reference line of sight direction of the driver in a direction that aligns with the forward straight-traveling direction of the vehicle 20.

If it is determined that a driver has looked away, the looking away determination unit 16 may record in the database 104, the ID of the drive recorder 2 of the vehicle 20 driven by the driver who has looked away and information of the time at which the driver has looked away, in association with each other.

In the above processing, the image processing device 1 may transmit information of a reference line of sight direction to the drive recorder 2. The drive recorder 2 may memorize information of a reference line of sight direction, and the drive recorder 2 itself may perform looking away determination through a similar processing on the basis of the angle between the driver's current line of sight direction and the reference line of sight direction.

In the above processing, the image processing device 1 performs the processing of detecting a reference line of sight direction and reference face direction. However, the drive recorder 2 may also detect the driver's reference line of sight direction and reference face direction through a similar processing. Then, the drive recorder 2 may transmit the reference line of sight direction and the reference face direction to the image processing device 1. The image processing device 1 may determine whether the driver has looked away on the basis of the angle between a reference line of sight direction detected by the drive recorder 2 and the driver's line of sight direction included in new captured images. In the case where the drive recorder 2 performs the processing of the image processing device 1, the processing is performed in a manner specifically described below. In this case, the drive recorder 2 demonstrates functions of the respective processing units of the image processing device 1. For example, the control device 24 demonstrates the functions of the sensing information acquisition unit 12, the image acquisition unit 13, the reference direction detection unit 14, the line of sight direction detection unit 15, and the looking away determination unit 16.

Figure 10:
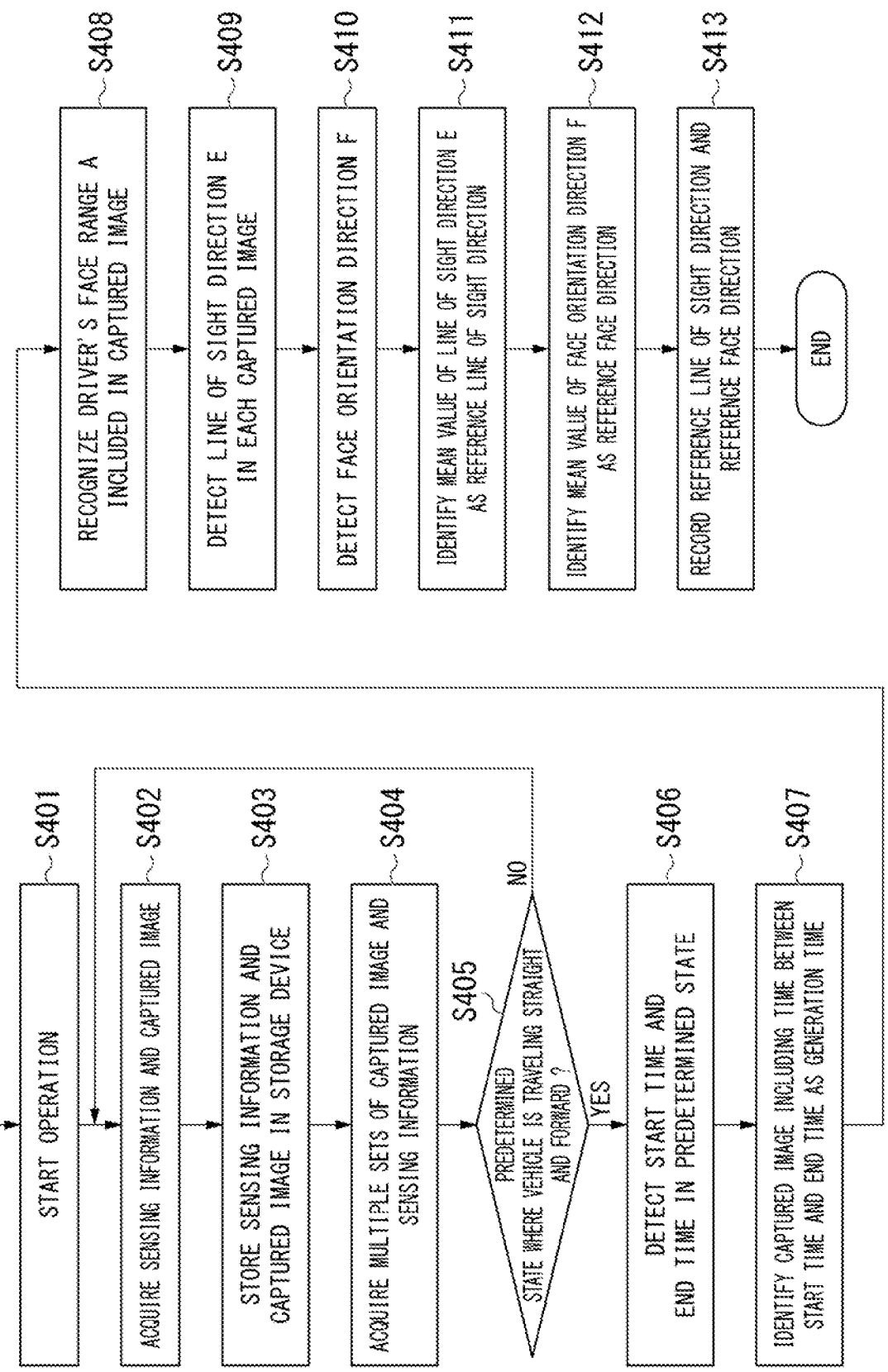
FIG. 10 is a second diagram showing a processing flow of the drive recorder according to the present example embodiment.

FIG. 10 is a second diagram showing a processing flow of the drive recorder 2.

When the electrical system of the vehicle is activated, the drive recorder 2 starts to operate (Step S401). Also, when the electrical system of the vehicle is activated, the acceleration sensor 3, the velocity sensor 4, and the steering wheel angle sensor 5 start sensing. After the drive recorder 2 has been activated, the information acquisition device 21 acquires sensing information such as the acceleration rate, the velocity, and the steering wheel angle. The information acquisition device 21 outputs the sensing information to the control device 24.

In the drive recorder 2, the camera 23 generates captured images. The camera 23 outputs the captured images to the control device 24. The control device 24 acquires the sensing information and the captured images. The drive recorder 2 repeats transmission of captured images and sensing information to the image processing device 1.

The sensing information acquisition unit 12 of the drive recorder 2 acquires the sensing information and the captured images (Step S402). The sensing information acquisition unit 12 stores the sensing information and the captured images in the storage device 25 (Step S403). In the storage device 25, sensing information and captured images may be recorded in association with each other on the basis of the ID of the drive recorder 2. The sensing information acquisition unit 12 acquires sensing information and captured images at predetermined timings or sequentially, and records the sensing information and the captured images in the storage device 25. The control unit 11 instructs the reference direction detection unit 14 to perform the process of detecting a reference line of sight direction.

The reference direction detection unit 14 acquires a set of a captured image and sensing information recorded in the storage device 25 (Step S404). The reference direction detection unit 14 determines whether the vehicle 20 is in a predetermined state where it is traveling straight and forward, on the basis of the acquired sensing information (Step S405). In the present example embodiment, the reference direction detection unit 14 determines whether the vehicle 20 is traveling straight and forward and the aspect of the straight traveling is in a predetermined state, on the basis of the acquired sensing information. The aspect of straight traveling being in the predetermined state refers to any one of the following states: a state where the acceleration rate of the vehicle 20 is equal to or higher than a predetermined threshold value; a state where the velocity is equal to or higher than a predetermined velocity and the steering wheel rotation angle is an angle indicating forward; and a state where the velocity is equal to or higher than a predetermined threshold value.

If the vehicle 20 is in the predetermined state of traveling straight and forward, the reference direction detection unit 14 detects from the acquired sensing information, a start time and an end time when the vehicle 20 is in the predetermined state (such as where the acceleration rate is equal to or higher than a predetermined threshold value) (Step S406). Alternatively, the reference direction detection unit 14 may detect from the acquired sensing information, a start time and an end time when the velocity is equal to or higher than a predetermined velocity and the steering wheel rotation angle is an angle indicating forward. Alternatively, the reference direction detection unit 14 may detect from the acquired sensing information, a start time and an end time when the velocity is equal to or higher than a predetermined threshold value. The reference direction detection unit 14 identifies captured images that includes, as generation times, times between the detected start time and end time, among the plurality of acquired captured images (Step S407). In the case where the captured images are a moving image, the reference direction detection unit 14 may identify, as captured images, the frame images that includes, as generation times, times between the detected start time and end time, among frame images included in the moving image.

The reference direction detection unit 14 recognizes the face range A of the driver included in the identified captured images (Step S408). The reference direction detection unit 14 detects the line of sight direction E in each captured image on the basis of the driver's eyelid ranges and pupil positions included in the face range A (Step S409). Also, the reference direction detection unit 14 detects the face orientation direction F on the basis of the driver's face information included in the face range A (Step S410). The reference direction detection unit 14 calculates the mean value of line of sight directions E calculated on the basis of a plurality of the captured images and the mean value of face orientation directions F. The reference direction detection unit 14 identifies the mean value of line of sight directions E as a reference line of sight direction (Step S411). Also, the reference direction detection unit 14 identifies the mean value of face orientation directions F as a reference face direction (Step S412). Then, the reference direction detection unit 14 records in the storage device 25 the calculated reference line of sight direction and reference face direction (Step S413).

As a result, it is possible to record the reference line of sight direction and the reference face direction when the vehicle 20 is traveling straight and forward and the aspect of the straight traveling is in the predetermined state. When the vehicle 20 is traveling forward and the aspect of the straight traveling is in the predetermined state (any one state of predetermined acceleration rate or higher, predetermined acceleration rate or higher while steering wheel angle is straight and forward, and predetermined velocity or higher), the direction of the driver's face is highly likely to be in the forward straight-traveling direction. Therefore, the reference line of sight direction and the reference face direction detected in such a state can be estimated to be the line of sight direction and the face direction when the driver is facing the forward straight-traveling direction of the vehicle 20.

Figure 11:
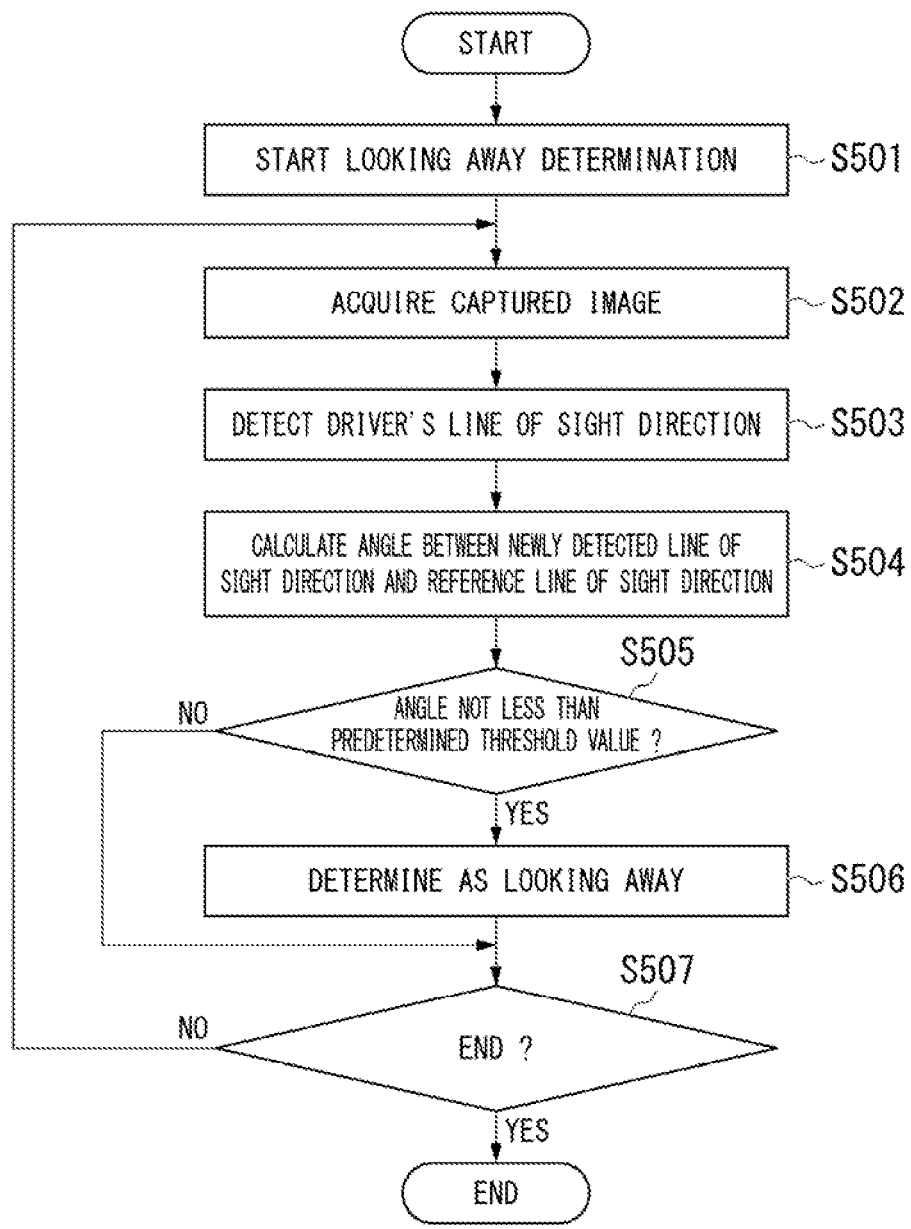
FIG. 11 is a third diagram showing a processing flow of the drive recorder according to the present example embodiment.

FIG. 11 is a third diagram showing a processing flow of the drive recorder 2.

The control device 24 of the drive recorder 2 may perform a looking away determination through a processing similar to that of the image processing device shown in FIG. 8. The control device 24 determines whether the driver has looked away, using a reference line of sight direction and a reference face direction. Specifically, the control unit 11 starts a determination of looking away (Step S501). Then, the line of sight direction detection unit 15 acquires captured images from the storage device 25 (Step S502).

The line of sight direction detection unit 15 may extract captured images at a time at which an acceleration rate is equal to or higher than a predetermined threshold value, such as an acceleration rate at the time of incident occurrence, from the acquired captured images. The line of sight direction detection unit 15 detects the line of sight direction of the driver included in the acquired captured images through a process similar to that described above (Step S503). The looking away determination unit 16 acquires the reference line of sight direction recorded in the storage device 25.

The looking away determination unit 16 calculates the angle between the newly detected line of sight direction and the reference line of sight direction (Step S504). The looking away determination unit 16 determines whether the angle between the newly detected line of sight direction and the reference line of sight direction is equal to or greater than a predetermined threshold value (Step S505). If the angle between the newly detected line of sight direction and the reference line of sight direction is equal to or greater than the predetermined threshold value, the looking away determination unit 16 determines that the driver has looked away (Step S506). The control unit 11 determines whether to end the process (Step S507). If the process is not to end, the control unit 11 repeats the process from Step S302.

In the above processing, the image processing device 1 determines whether looking away has performed on the basis of the angle between the new line of sight direction and a reference line of sight direction. However, it may further use information of a reference face direction to perform a looking away determination. For example, the looking away determination unit 16 may determine the driver has looked away in a case where a length of time during which the face direction is out of a predetermined range is equal to or longer than a predetermined length of time.

Figure 12:
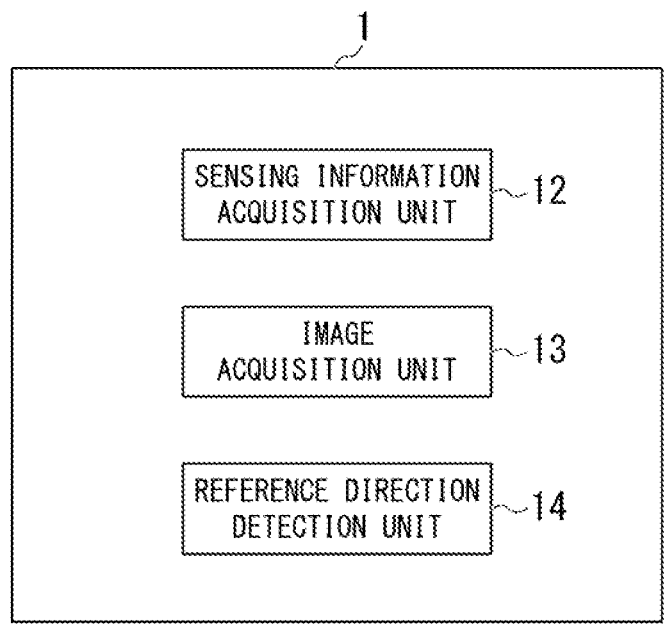
FIG. 12 is a diagram showing an example of a configuration of the image processing device according to the present example embodiment.

FIG. 12 is a diagram showing an example of a configuration of the image processing device 1.

Figure 13:
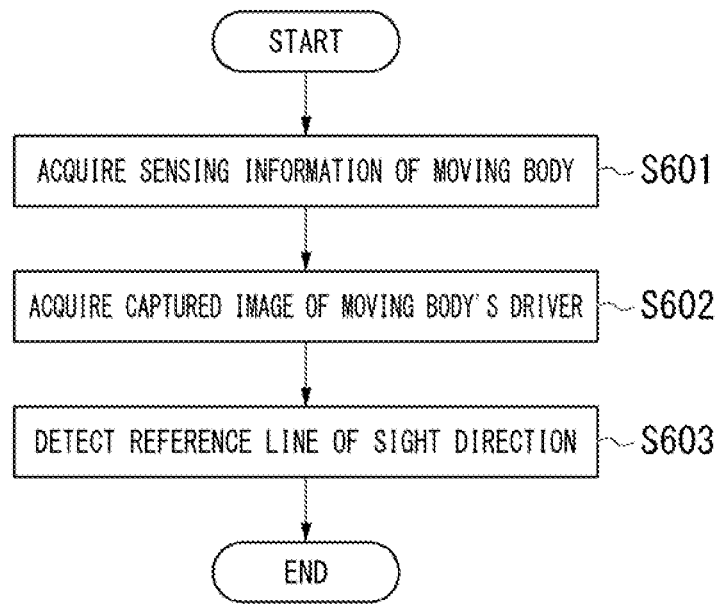
FIG. 13 is a diagram showing a processing flow of the image processing device shown in FIG. 12.

FIG. 13 is a diagram showing a processing flow of the image processing device 1 shown in FIG. 12.

It is sufficient that the image processing device 1 include at least a sensing information acquisition unit 12, an image acquisition unit 13, and a reference direction detection unit 14.

The sensing information acquisition unit 12 acquires sensing information of a moving body (Step S601).

The image acquisition unit 13 acquires captured images that capture the driver driving the moving body (Step S602).

The reference direction detection unit 14 acquires captured images captured in a state where the moving body is traveling forward on the basis of sensing information, and detects a reference line of sight direction when the driver is facing forward, on the basis of statistical values of the line of sight direction of the driver indicated by the captured images (Step S603).

The image processing device 1 and the drive recorder 2 described above have therein a computer system. The process of each processing described above is stored in a computer-readable recording medium in the form of a program, and the processing mentioned above is performed by a computer reading and executing the program. Here, the computer-readable recording medium refers to a magnetic disk, a magnetic optical disk, a CD-ROM, a DVD-ROM, a semiconductor memory, or the like. Moreover, the computer program may be distributed to a computer via a communication line, and the computer having received the distributed program may execute the program.

Also, this program may be a program for realizing some of the functions described above. Furthermore, the program may be a so-called difference file (a difference program) which can realize the functions described above in combination with a program already recorded in the computer system.

This application is based upon and claims the benefit of priority from Japanese Patent Application No. 2019-108370, filed Jun. 11, 2019, the disclosure of which is incorporated herein in its entirety.

INDUSTRIAL APPLICABILITY

The present invention may be applied to an image processing device, an image processing method, and a recording medium.

REFERENCE SYMBOLS

1 Image processing device
2 Drive recorder
3 Acceleration sensor
4 Velocity sensor
5 Steering wheel angle sensor
11 Control unit (control means)
12 Sensing information acquisition unit (sensing information acquisition means)
13 Image acquisition unit (image acquisition means)
14 Reference direction detection unit (reference direction detection means)
15 Line of sight direction detection unit (line of sight direction detection means)
16 Looking away determination unit (looking away determination means)
21 Information acquisition device
22 Communication device
23 Camera
24 Control device
25 Storage device
241 Captured image transmission unit (captured image transmission means)
242 Sensing information transmission unit (sensing information transmission means)

What is claimed is:

1. An image processing device comprising:
at least one memory configured to store instructions; and
at least one processor configured to execute the instructions to:
acquire sensing information indicating a state of a moving body;
acquire a plurality of captured images that capture a driver driving the moving body;
identify, from the plurality of acquired captured images, a plurality of captured images as being captured in a state of the moving body traveling forward based on the sensing information;
set a reference line of sight direction in a case of the driver facing forward, based on a statistical value of a line of sight direction of the driver indicated by each of the plurality of identified captured images; and
record the reference line of sight direction calculated based on captured images captured by an in-vehicle device in the moving body, in association with the ID of the in-vehicle device.

2. The image processing device according to claim 1, wherein the sensing information is an acceleration rate of the moving body, and
wherein the at least one processor is configured to execute the instructions to identify, from the plurality of acquired captured images, a plurality of captured images captured in a state of the acceleration rate being equal to or higher than a predetermined threshold value.

3. The image processing device according to claim 1, wherein the sensing information is a velocity of the moving body and a rotation angle of a steering wheel, and
wherein the at least one processor is configured to execute the instructions to identify, from the plurality of acquired captured images, a plurality of captured images captured in a state of the velocity being equal to or higher than a predetermined velocity and the rotation angle of the steering wheel being an angle indicating forward.

4. The image processing device according to claim 1, wherein the sensing information is a velocity of the moving body, and
wherein the at least one processor is configured to execute the instructions to identify, from the plurality of acquired captured images, a plurality of captured images captured in a state of the velocity being equal to or higher than a predetermined threshold value.

5. The image processing device according to claim 1, wherein the at least one processor is configured to execute the instructions to acquire, as the sensing information, information indicating a state of the moving body being traveling forward, from an in-vehicle device of the moving body.

6. The image processing device according to claim 1, wherein the at least one processor is configured to execute the instructions to determine whether or not the driver is looking away, based on a difference between: a reference line of sight direction in the case of the driver facing forward; and a current line of sight direction.

7. The image processing device according to claim 1, wherein the at least one processor is configured to execute the instructions to notify an in-vehicle device of the moving body, of information indicating a reference line of sight direction in the case of the driver facing forward.

8. An image processing method comprising:
acquiring sensing information indicating a state of a moving body;
acquiring a plurality of captured images that capture a driver driving the moving body;
identifying, from the plurality of acquired captured images, a plurality of captured images as being captured in a state of the moving body traveling forward based on the sensing information;
setting a reference line of sight direction in a case of the driver facing forward, based on a statistical value of a line of sight direction of the driver indicated by each of the plurality of identified captured images; and
recording the reference line of sight direction calculated based on captured images captured by an in-vehicle device in the moving body, in association with the ID of the in-vehicle device.

9. A non-transitory recording medium storing a program, which if executed, causes a computer of an image processing device to execute:
acquiring sensing information indicating a state of a moving body;
acquiring a plurality of captured images that capture a driver driving the moving body;
identifying, from the plurality of acquired captured images, a plurality of captured images as being captured in a state of the moving body traveling forward based on the sensing information;
setting a reference line of sight direction in a case of the driver facing forward, based on a statistical value of a line of sight direction of the driver indicated by each of the plurality of acquired captured images; and
recording the reference line of sight direction calculated based on captured images captured by an in-vehicle device in the moving body, in association with the ID of the in-vehicle device.

10. The image processing device according to claim 7, wherein the at least one processor is configured to execute the instructions to notify a dash cam, which is in the vehicle, of information indicating a reference line of sight direction in the case of the driver facing forward.

11. The image processing device according to claim 1, wherein the at least one processor is configured to execute the instructions to determine whether or not the driver is looking away based on a difference between a previously presentedly detected line of sight direction from previously presented captured images and the reference line of sight direction recorded in association with the ID of the in-vehicle device capturing the previously presented captured images.

12. The image processing device according to claim 1, wherein the at least one processor is configured to execute the instructions to:
determine whether the moving body is travelling straight and forward based on the sensing information; and
identify, from the plurality of acquired captured images, the plurality of captured images as being captured in the state of the moving body traveling forward in a case where the moving body is determined to be travelling straight and forward.

13. The image processing device according to claim 12, wherein the at least one processor is configured to execute the instructions to determine whether the moving body is travelling straight and forward in a case where a velocity of the moving body is equal to or higher than a predetermined velocity and a rotation angle of a steering wheel of the moving body is an angle indicating forward.

* * * * *